H. G. CORDLEY.
FAUCET.
APPLICATION FILED JULY 20, 1909.

981,842.

Patented Jan. 17, 1911.

Witnesses
W. H. Rockwell
R. N. Flint.

Inventor
Henry G. Cordley
by A. P. Greely
Attorney

THE NORRIS PETERS CO., WASHINGTON, D. C.

UNITED STATES PATENT OFFICE.

HENRY G. CORDLEY, OF GLEN RIDGE, NEW JERSEY.

FAUCET.

981,842. Specification of Letters Patent. Patented Jan. 17, 1911.

Application filed July 20, 1909. Serial No. 508,673.

*To all whom it may concern:*

Be it known that I, HENRY G. CORDLEY, a citizen of the United States, residing at Glen Ridge, in the county of Essex, State of New Jersey, have invented certain new and useful Improvements in Faucets, of which the following is a description, reference being had to the accompanying drawings, forming a part hereof.

My invention relates to self-closing faucets designed for use with water coolers of the type comprising an outer and an inner receptacle, the inner receptacle being designed to contain drinking water and the space between the two receptacles being designed to contain ice for cooling the drinking water; and the objects of my invention are to provide an arrangement whereby a bushing carried by the inner receptacle is engaged by a nipple forming a part of the faucet to thereby secure the two receptacles together and provide an outlet for the water and at the same time provide a construction in which the faucet may be conveniently removed and the cooler disassembled for the purpose of cleaning it; to provide a faucet which may be readily taken apart for the purpose of cleaning its several parts, and one in which the inner surface of the faucet is coated with a metal which will not be corroded or otherwise acted upon by the water which comes into contact therewith; to provide a faucet which will be neat and attractive in appearance, and one which is of simple construction and which may be easily and cheaply manufactured; all as illustrated in the accompanying drawing, described in the following specification, and particularly claimed in the clauses of the concluding claim.

Figure 1:
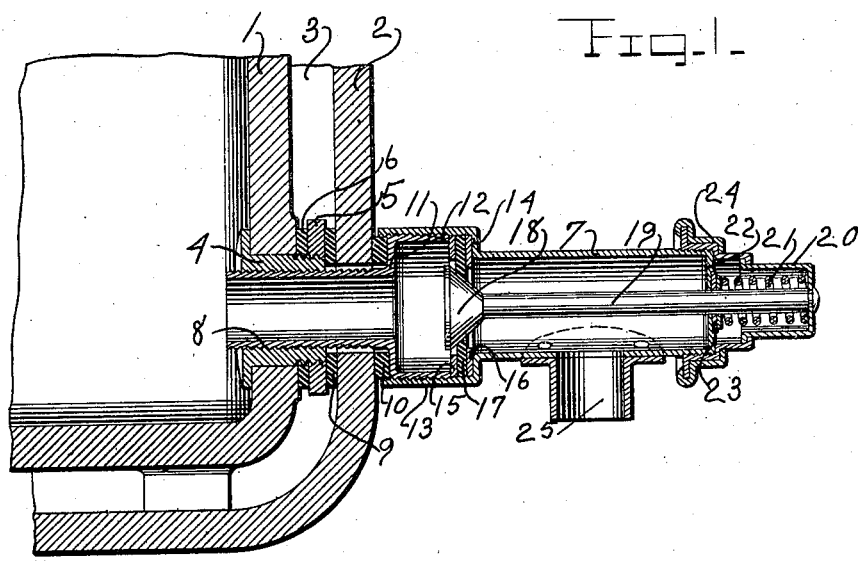
Figure 2:
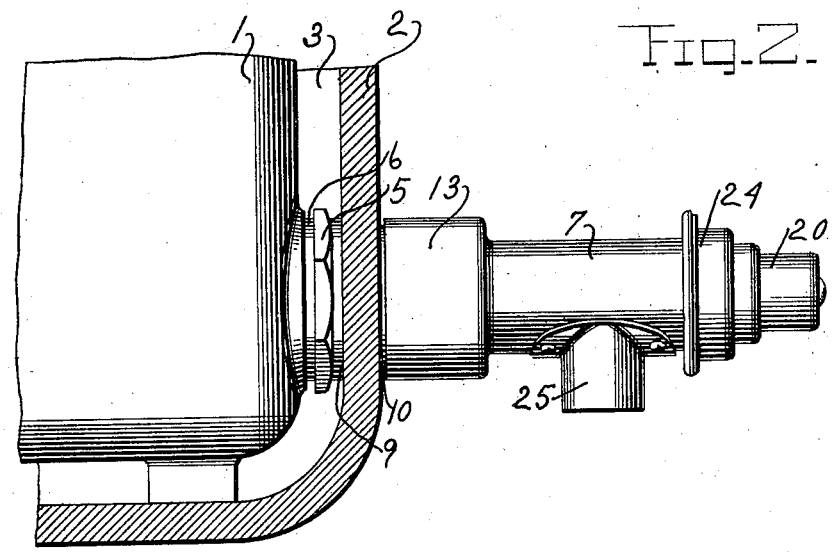

In the accompanying drawing, Figure 1 is a sectional view showing a portion of a water cooler with my device attached thereto, and Fig. 2 is a view showing the faucet and a portion of the inner jar in elevation.

In the drawing 1 represents the inner and 2 the outer receptacles of a water cooler of the type above referred to, a space 3 being provided between the two (which space is relatively much larger at portions of the cooler not shown than in the part shown in the drawing) for containing ice and water therefrom for the purpose of cooling the water in the inner receptacle 1. The inner receptacle 1 is provided with a bushing 4 inserted in an opening formed at its lower end and held in place by a nut 5 engaging the threaded outer end thereof, a rubber or equivalent washer 6 being provided for the purpose of securing a tight joint as will be understood. The bushing 4 is provided with an interior screw thread as shown, and this bushing after having been secured in the opening in the inner receptacle 1 is intended to remain permanently in place, although the inner receptacle with its detached bushing will be frequently removed for the purpose of cleaning it.

7 is the body portion of my improved faucet, and 8 is a nipple projecting from the faucet and provided with an exterior screw thread adapted to engage the screw thread within the bushing 4. The threaded portion of the nipple 8 passes through an opening near the bottom of the outer receptacle 2 as shown, and suitable packing washers 9, 10 are provided for the purpose of securing a tight joint between the several parts. The packing washer 10 is upon the outside of the cooler and is held between an enlarged portion of the faucet and the outer surface of the cooler, the nipple 8 being provided with an annular shoulder 11 in the form shown, between which and the exterior of the outer casing 2 the washer 10 is held.

Referring to the drawing, it will be obvious that the faucet (the nipple 8 being regarded as a part of the faucet) may be readily removed from the cooler by unscrewing the nipple 8 from the bushing 4, whereupon the inner receptacle 1 may be readily lifted from the outer receptacle 2 for the purpose of cleaning and sterilizing it, and that in replacing the inner jar it will be unnecessary to place the hand within the inner jar, thus destroying to a certain degree the benefits derived from sterilization, as has been the case in former structures having a nut at the inner end of the faucet which had to be screwed up from within the inner jar. It will also be obvious that when the parts are assembled in the manner illustrated in the drawing the inner and outer receptacles will be held together by the nipple 8.

The nipple 8 is enlarged at its outer end as at 12, and is threaded to engage the threaded inner surface of an enlarged portion 13 of the body portion 7. This enlargement 13 provides an annular shoulder at 14 upon which a valve seat rests, the same comprising annular metallic washers 15, 16 and an intermediate rubber or equivalent washer 17, the parts 15, 16, 17 of the valve seat being held against the annular shoulder 14 by the end of the enlarged portion 12 of the nipple 8 as will be understood.

18 is the reciprocating valve of my faucet, and 19 the stem thereof.

20 is a push button secured to the outer end of the stem 19 and adapted to be engaged by the finger in operating the faucet, and 21 is a spring acting between the push button 20 and the closed outer end 22 of the body portion 7 and serving to keep the valve 18 normally upon its seat, the faucet being of the self-closing type.

23 is a packing surrounding the valve stem 19 and against which the inner end of the spring 21 abuts, a metallic washer being interposed between the spring and the packing 23 as shown, and said packing being seated in a recess or depression formed in the closed end 22 of the body portion 7.

24 is a cap in threaded engagement with the outer end of the body portion 7 of the faucet and serving to inclose the parts and produce a faucet having a more finished and attractive appearance, and 25 is a discharge spout through which the water flows when the valve 18 is off its seat.

The portion of the inner surface of my faucet with which the water comes into contact is coated with a metal which will not be acted upon or corroded by the water, and I have used a coating or plating of silver deposited electrically with satisfactory results. The valve 18 and its stem are also preferably coated in the same way. This coating will be applied to the interior of the nipple 8 and its enlarged portion 12, and, preferably also to the inner surface of the body portion 7, although it is less important that this body portion be coated as the water does not stand in it as in the nipple 8.

Having thus described my invention and explained the operation thereof, I claim and desire to secure by Letters Patent:

1. In a water cooler, an outer and an inner receptacle each having an opening adjacent its lower end; a bushing within the opening of said inner receptacle and threaded upon its interior, the inner end of said bushing having a flange adapted to engage the inner surface of said inner receptacle around the opening therein, and the outer end thereof being threaded and provided with a nut to secure said bushing in place and of sufficient area to engage the inner surface of said outer receptacle around the opening therein; a nipple having an annular shoulder adjacent its outer end adapted to engage the outer surface of said outer receptacle around the opening therein and threaded upon its exterior, and adapted to extend through the opening in said external receptacle and to engage the threaded interior of said bushing to thereby secure the two receptacles together; a faucet body secured to the outer end of said nipple; a valve for controlling the flow through said faucet; and means for operating said valve.

2. In a water cooler, an outer and an inner receptacle each having an opening adjacent its lower end; a bushing within the opening of said inner receptacle and threaded upon its interior, the inner end of said bushing having a flange adapted to engage the inner surface of said inner receptacle around the opening therein, and the outer end thereof being threaded and provided with a nut to secure said bushing in place and of sufficient area to engage the inner surface of said outer receptacle around the opening therein; a nipple the outer end of which is enlarged to thereby form an annular shoulder adapted to engage the outer surface of said outer receptacle around the opening therein and threaded, and the inner end of which nipple is threaded and adapted to extend through the opening in said external receptacle and to engage the threaded interior of said bushing to thereby secure the two receptacles together; a faucet body the inner end of which is threaded upon its interior and adapted to engage the enlarged threaded outer end of said nipple: a valve for controlling the flow through said faucet; and means for operating said valve.

This specification signed and witnessed this 7th day of July A. D. 1909.

HENRY G. CORDLEY.

In the presence of—
GEORGE B. WILLIAMS,
WILLIAM M. REIS.